United States Patent

[11] 3,567,857

[72] Inventor Robert E. Lynn
Somerville, N.J.
[21] Appl. No. 713,331
[22] Filed Mar. 15, 1968
[45] Patented Mar. 2, 1971
[73] Assignee Hewlett-Packard Company
Palo Alto, Calif.

[54] PULSE INHIBIT CIRCUIT
18 Claims, 2 Drawing Figs.

[52] U.S. Cl. .......... 178/7.3, 178/69.5
[51] Int. Cl. .......... H04n 5/10
[50] Field of Search .......... 178/7.3 (E), 7.5 (E), 69.5 (TV)

[56] References Cited

UNITED STATES PATENTS 3,311,701 3/1967 Lynch .......... 178/69.5(TV)
3,372,233 3/1968 Currey .......... 178/69.5(TV)
3,424,867 1/1969 Monnier .......... 178/69.5(TV)

*Primary Examiner*—Richard Murray
*Attorney*—Roland I. Griffin

ABSTRACT: The picture signal is removed from an amplified composite video input signal by a sync stripper. Vertical sync pulses extracted from the remaining composite synchronizing signal periodically enable a gate to pass portions of a timing signal from an oscillator operating at twice the horizontal line rate. The gated portions of this timing signal periodically trigger a vertical deflection circuit to initiate retrace of the vertical field scans of an electron beam of a cathode ray tube. A binary scaler halves the repetition rate of the timing signal from the oscillator. The resultant signal periodically triggers a horizontal deflection circuit to initiate retrace of the horizontal line scans of the electron beam of the cathode ray tube. An automatic phase control circuit locks the oscillator in phase with the composite synchronizing signal and stabilizes the rate of the timing signal at twice the horizontal line rate. In response to the signals from the oscillator and the binary scaler a control gate passes the horizontal timing portions of the composite synchronizing signal and inhibits passage of double frequency portions in the vertical synchronizing interval of the composite synchronizing signal. The horizontal timing portions are regenerated by a blocking oscillator and supplied to the automatic phase control circuit for phase and frequency comparison with a ramp signal generated in phase with and at the rate of the signal from the binary scaler. When the compared signals are not within the pull-in range of the automatic phase control circuit another control circuit prevents the inhibit cycle of the control gate.

INVENTOR
ROBERT E. LYNN

BY Roland I. Griffin

ATTORNEY

INVENTOR
ROBERT E. LYNN
BY *Roland D. Griffin*
ATTORNEY

PULSE INHIBIT CIRCUIT

BACKGROUND AND SUMMARY OF THE INVENTION

This invention relates generally to television synchronizing systems and more particularly to a pulse inhibit circuit for use in extracting the horizontal timing information from the composite synchronizing signal supplied to such systems.

The vertical resolution of the image displayed on the screen of a device such as a cathode ray picture tube may be substantially improved by evenly interlacing the horizontal line scans of a first field between the horizontal line scans of a second field. An improved system for achieving this interlacing is disclosed in Oliver et al's copending patent application entitled TELEVISION SYNCHRONIZING SYSTEM and filed on Mar. 7, 1968. Even interlacing is achieved by initiating retrace of the vertical scan of field one precisely at the end of the last complete horizontal line scan of field two and by initiating retrace of the vertical scan of field two precisely one-half a horizontal line scan after the last complete horizontal line scan of field one. This requires that the composite synchronizing signal include timing information corresponding to twice the horizontal line rate in addition to timing information corresponding to the horizontal line rate and the vertical field rate. The additional timing information is obtained by employing serrated vertical field sync pulses each immediately preceded and followed by a number of equalizing pulses, where the vertical field sync pulse sections and the equalizing pulses occur at twice the horizontal line rate.

The composite synchronizing signal is typically applied to a low pass filter or an integrator to extract the vertical field sync pulses and to a high pass filter of differentiator to extract the horizontal line sync pulses. The double frequency equalizing pulses in the vertical synchronizing interval may be used to equalize the initial and final charge conditions of the low pass filter or integrator while at the same time providing horizontal timing information. However, the double frequency equalizing pulses and vertical sync pulse sections that do not provide horizontal timing information must be eliminated from the waveform produced by the differentiator or high pass filter to insure proper timing of horizontal synchronizing circuit. One conventional approach for accomplishing this is to employ a blocking oscillator or multivibrator having its delay time adjusted so that it may be triggered at the horizontal line rate but not at twice that rate. A significant disadvantage of this approach is that when an equalizing pulse or vertical sync pulse section providing horizontal timing information is lost due to noise or some other reason, the blocking oscillator or multivibrator may then be triggered during the remainder of the vertical synchronizing interval only by succeeding equalizing pulses and vertical sync pulses sections that do not provide horizontal timing information. This may be worse than doing nothing at all to eliminate the double frequency equalizing pulses and vertical sync pulse sections not providing horizontal timing information.

Accordingly, it is an object of this invention to provide an improved pulse inhibit circuit that may be used in a television synchronizing system to extract a synchronizing signal of the horizontal line rate from a synchronizing interval of twice the horizontal line rate.

Another object of this invention is to provide a pulse inhibit circuit that is not sensitive to noise or to missing or extraneous pulses in a synchronizing pulse train.

Still another object of this invention is to provide a pulse inhibit circuit that may be reliably time from the automatic phase controlled oscillator of the improved synchronizing system described in Oliver et al's above-mentioned copending patent application and that may be used with composite synchronizing signals of either the positive interlace type or the more primitive nonpositive interlace type.

These objects are accomplished according to the illustrated embodiment of this invention by supplying a gate with timing pulses of twice the horizontal line rate from an oscillator that is phase locked to the composite synchronizing signal and stabilized at twice the horizontal line rate. A binary scaler is also supplied with these timing pulses. The binary scaler halves the repetition rate of the timing pulses and supplies both the gate and a horizontal deflection circuit with pulses at the horizontal line rate. In response to the pulses from the oscillator and the binary scaler, the gate provides control pulses at the horizontal line rate and within the time intervals between successive horizontal sync pulses of the composite synchronizing signal. These control pulses periodically disable a control gate supplied with impulses derived from the leading edges of the composite synchronizing signal and thereby eliminate any impulses derived from double frequency equalizing pulses and vertical sync pulse sections not providing horizontal timing information. The impulses passed by this control gate are regenerated by a blocking oscillator to provide a horizontal sync pulse train at the horizontal line rate and in phase with the horizontal sync pulses of the composite synchronizing signal. When this horizontal sync pulse train and the pulses applied to the horizontal deflection circuit are not within the pull-in range of the phase locked oscillator a control circuit prevents the inhibit cycle of the control gate.

These and other objects of this invention will be apparent from a reading of this specification and an inspection of the accompanying drawing in which:

FIG. 1 is a block diagram of a television synchronizing system including a pulse inhibit circuit according to the preferred embodiment of this invention; and FIG. 2 is a diagram illustrating the waveforms at various points in the synchronizing system of FIG. 1. The letters of the waveforms in FIG. 2 have been reproduced at the points in the synchronizing system of FIG. 1 where the waveforms appear.

DESCRIPTION OF THE PREFERRED EMBODIMENT

Figure 1:
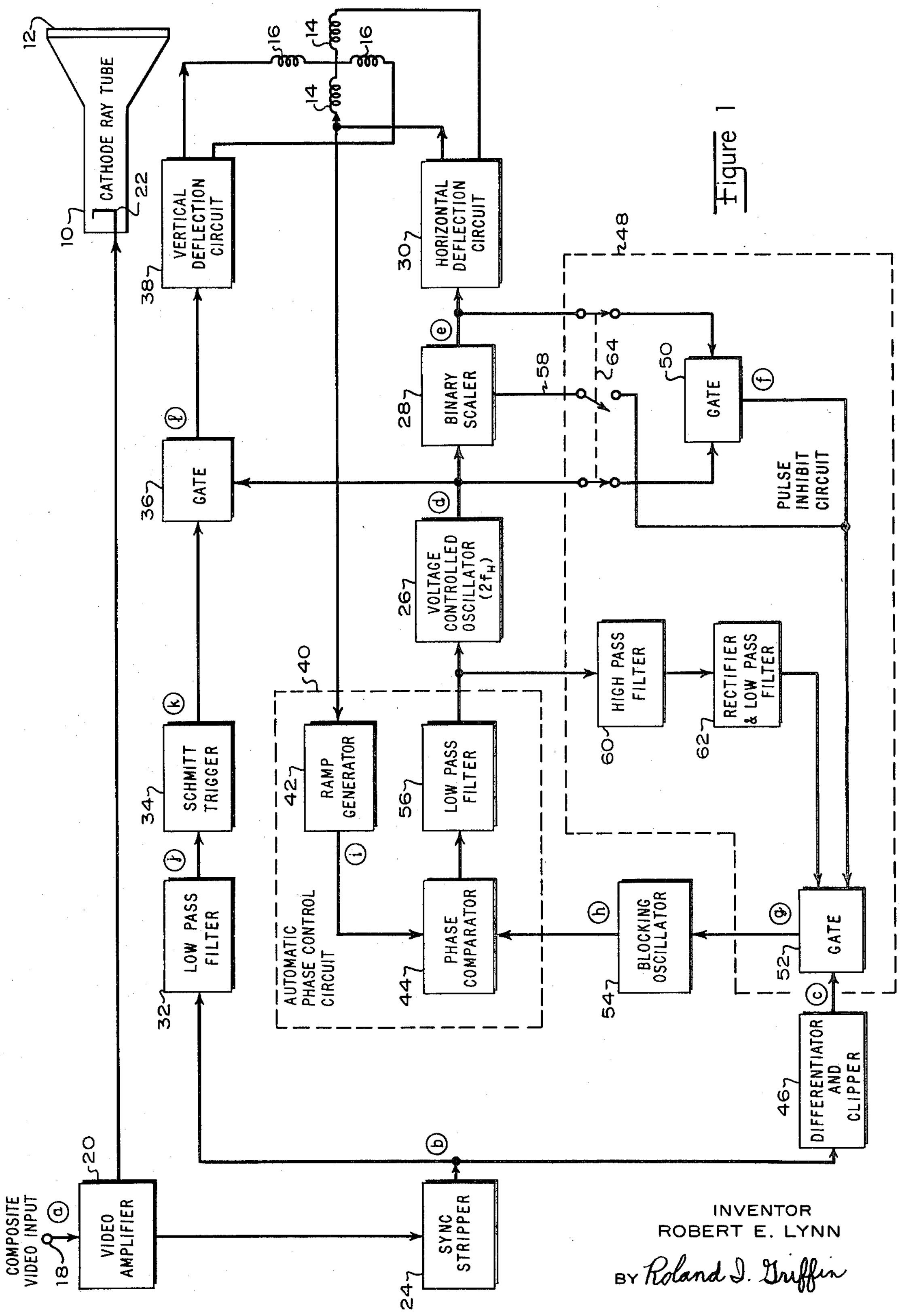
Figure 2:
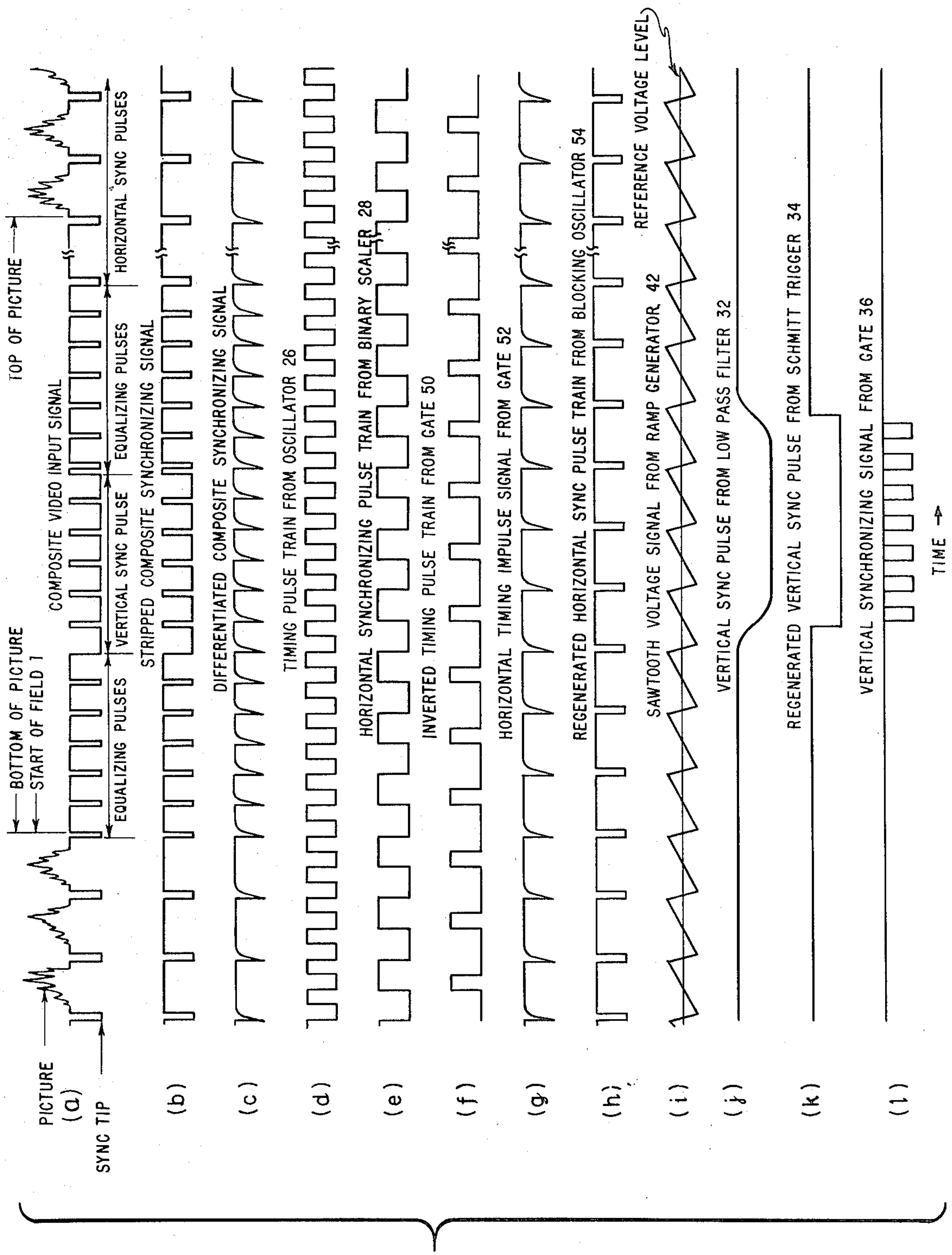

Referring now to FIG. 1, there is shown a cathode ray tube 10 having a display screen 12 and horizontal and vertical magnetic deflection coils represented schematically at and 16 respectively. A composite video signal comprising both picture and synchronizing signals is supplied to the input 18 of a video amplifier 20. The vertical synchronizing interval of field one of a typical composite video signal is shown in FIG. 2*a*. Video amplifier 20 is connected for supplying the amplified composite video signal to a control electrode 22 of cathode ray tube 10 to control the intensity of the electron beam as it scans across display screen 12. The video amplifier is also connected for supplying the composite video signal to a sync stripper 24. Sync stripper 24 removes the picture signal from the composite video signal thereby leaving the composite synchronizing signal illustrated for field one in FIG 2*b*. The composite synchronizing signal is supplied to a television synchronizing system of, for example, the type shown and described in Oliver et al's above-mentioned copending patent application.

This television synchronizing system includes a voltage controlled oscillator 26 for continuously producing timing pulses at an integral multiple of, for example, twice the horizontal line rate. Such a timing pulse train is shown in FIG. 2*d*. Oscillator 26 is connected for supplying the timing pulses to a binary scaler 28. The repetition rate of the timing pulses is halved by binary scaler 28 to produce horizontal synchronizing pulses at the horizontal line rate as shown in FIG. 2*e*. Binary scaler 28 is connected for supplying these horizontal synchronizing pulses to a horizontal deflection circuit 30. The horizontal deflection circuit is triggered by each of these horizontal synchronizing pulses to supply horizontal deflection coils 14 with a sawtooth current waveform having a negative-going ramp with a relatively gentle slope. During the negative-going ramp, the electron beam of cathode ray tube 10 is deflected from the end of a horizontal line scan at the right side of display screen 12 to the beginning of the next horizontal line scan at the left aside of the display screen. This retrace of the horizontal line scan occurs in phase with the horizontal sync pulses of the composite synchronizing signal so long as oscillator 26 produces timing pulses in phase with the composite synchronizing signal and at twice the horizontal line rate. During the positive-going ramp, the electron beam of cathode ray tube 10 scans from left to right back across display screen 12.

Sync stripper 24 is connected for supplying the composite synchronizing signal to a low pass filter 32. Low pass filter 32 extracts the vertical sync pulses from the composite synchronizing signal as shown for field one in FIG. 2*j*. A Schmitt trigger 34 is connected for regenerating the vertical sync pulses from low pass filter 32 and for supplying them to the control input of a gate 36. The regenerated vertical sync pulse for field one is shown in FIG. 2*k*. Oscillator 26 is connected for supplying the timing pulses of FIG. 2*d* to the signal input of gate 36. The regenerated vertical sync pulses periodically enable gate 36 to pass groups of the timing pulse s, such as the group shown for field one in FIG. 2*l*. Gate 36 is connected for supplying these groups of timing pulses to a vertical deflection circuit 38. Only the first pulse of each gated group is effective to trigger the vertical deflection circuit. Thus, vertical deflection circuit 38 is periodically triggered at the repetition rate of the vertical sync pulses of the composite synchronizing signal.

Each time vertical deflection circuit 38 is triggered, it supplies vertical deflection coils 16 with a sawtooth current waveform for deflecting the electron beam of cathode ray tube 10 from the end of a vertical field scan at the bottom of display screen 12 to the beginning of the next vertical field scan at the tope of the display screen. During field one, this retrace of the vertical field scan deflects the electron beam of cathode ray tube 10 from the end of the last horizontal line scan of field two at the bottom right corner of display screen 12 to the beginning of the first horizontal line scan of field one at the top left corner of the display screen. The sawtooth current waveform supplied to deflection coils 16 then deflects the electron beam of cathode ray tube 10 from the top left corner to the bottom center of the display screen in the time required to complete all of the horizontal line scans of field one. During field two, the retrace of the vertical field scan deflects the electron beam of cathode ray tube 10 from the end of the last horizontal line scan of field one at the bottom center of display screen 12 to the beginning of the first horizontal line scan of field two at the top center of the display screen. The sawtooth current waveform supplied to deflection coils 16 then deflects the electron beam of cathode ray tube 10 from the top center to the bottom right corner of the display screen in the time required to complete all of the horizontal line scans of field two.

Even and reliable interlacing requires that the retrace of the vertical scan during field two be started precisely one-half of a horizontal line scan after the last complete horizontal line scan of field one. For example, in the case of the 525-line, 60 fields-per-second U.S. system, the retrace of the vertical scan during field tow must be started precisely after 262 ½lines of field one. This is achieved nearly perfectly in the above-described synchronizing system by employing a single oscillator 26 to drive both the horizontal and vertical deflection circuits 30 and 38 and by employing an automatic phase control circuit 40 to phase lock the oscillator to the composite synchronizing signal and to stabilize the oscillator at twice the horizontal line rate.

The automatic phase control circuit 40 includes a ramp generator 42 connected to the output of horizontal deflection circuit 30. Ramp generator 42 is periodically triggered by the voltage signal developed across horizontal deflection coil 14 during the steep negative-going ramp of each sawtooth current waveform from horizontal deflection circuit 30. Each time ramp generator 42 is triggered it produces a sawtooth voltage signal that is symmetrically disposed about a reference voltage level such as ground and that has a linear and relatively steep negative-going ramp in phase with the retrace of the horizontal scan and a linear positive-going ramp of gentler slope. This sawtooth voltage signal is shown for field one in FIG. 2*i*. It is supplied to one input of a phase comparator 44 for comparison with a regenerated horizontal sync pulse train shown for field one in FIG. 2*h*.

The regenerated horizontal sync pulse train is produced by employing a differentiating and clipping circuit 46 to obtain a differentiated composite synchronizing signal from the leading edges of the horizontal sync pulses, equalizing pulses, and vertical sync pulse sections of the composite synchronizing signal from sync stripper 24. This differentiated composite synchronizing signal is shown for field one in FIG. 2*c*. A pulse inhibit circuit 48 is employed for extracting the horizontal timing information from the differentiated composite synchronizing signal. Pulse inhibit circuit 48 includes a gate 50 having a signal input connected for receiving and inverting the timing pulse train of FIG. 2*d* from oscillator 26 and having a control input connected for receiving the horizontal synchronizing pulse train of FIG. 2*e* from binary scaler 28. The horizontal synchronizing pulse train periodically enables gate 50 to pass the inverted timing pulses occuring at the horizontal line rate and initiated midway between successive horizontal synchronizing pulses as shown for field one in FIG. 2*f*. Gate 50 is connnected for supplying these gated inverted timing pulses to a control input of another gate 52. Differentiator and clipper 46 is connected for supplying the differentiated composite synchronizing signal of FIG. 2*c* to the signal input of gate 52. The gated inverted timing pulses disable gate 52 during the double frequency impulses of the differentiated composite synchronizing signal that do not provide horizontal timing information. These double frequency impulses are coincident with the leading edges of gated inverted timing pulses from gate 50 and hence the initiation of corresponding inhibit cycles of gate 52 when the timing pulses are produced by oscillator 26 at exactly the horizontal line rate and precisely in phase with the differentiated composite synchronizing signal. However, in practice the inherent time delays within the circuits of FIG. 1 cause or may be adjusted to cause the differentiated composite synchronizing signal to slightly lag the timing pulse train from oscillator 26. Thus, the double frequency impulses of the differentiated composite synchronizing signal that do not provide horizontal timing information normally occur well within corresponding inhibit cycles of gate 52. Gate 52 therefore passes only the impulses of the differentiated composite synchronizing signal that occur at the horizontal line rate and during the time intervals between successive gated inverted timing sign.ıls as shown for field one in FIG 2*g*. A blocking oscillator 54 is connected for regenerating these gated impulses of the differentiated composite synchronizing signal to produce the regenerated horizontal sync pulse train of FIG. 2*h*.

The regenerated horizontal sync pulse train from blocking oscillator 54 is supplied to another input of phase comparator 44. Each pulse of the regenerated horizontal sync pulse train is symmetrically disposed about the center of a corresponding negative-going ramp of the sawtooth voltage signal from ramp generator 42 when the retrace of the horizontal scan is in phase with the horizontal timing impulses of the differentiated composite synchronizing signal. Phase comparator 44 may comprise a sampling gate that is periodically enabled by the regenerated horizontal sync pulse train to pass portions of the sawtooth voltage signal. Thus, each time the sampling gate is enabled when the retrace of the horizontal scan is in phase with the horizontal timing impulses of the differentiated composite synchronizing signal, an output voltage signal comprising equal areas of opposite polarities with respect to the reference voltage level is produced by phase comparator 44. However, each time the sampling gate is enabled when the retrace of the horizontal scan is slightly out of phase with the horizontal timing impulses of the differentiated composite synchronizing signal, an output voltage signal comprising unequal areas of opposite polarities with respect to the reference voltage level is produced by phase comparator 44. The polarity of the larger area depends upon whether the retrace of the horizontal scan leads or lags the horizontal timing impulses of the differentiated composite synchronizing signal in phase. A low pass filter 56 is connected for receiving the output voltage signals from phase comparator 44. This low pass filter produces a zero, positive, or negative control voltage with respect to the reference voltage level from these output voltage signals depending upon the difference in area between the opposite polarity portions of the output voltage signals. Low pass filter 56 is connected for supplying this control voltage to a control input of voltage controlled oscillator 26 to phase lock the oscillator to the synchronizing signal and to stabilize the oscillator at twice the horizontal line rate. This keeps the horizontal synchronizing pulse train from binary scaler 28 in phase with the horizontal sync pulses of the composite synchronizing signal.

Operation of automatic phase control circuit 40 within its pull-in range when oscillator 26 is not phase locked to the composite synchronizing signal is not affected by the inhibit cycle of gate 52 since the longer acceptance cycle of gate 52 then occurs during the portions of the sawtooth voltage signal of FIG. 2*i* that yield stabilized phase control operation. The acceptance cycle of gate 52 is made longer than the inhibit cycle by employing alternate timing pulses of FIG. 2*d* to control the duration of the inhibit cycle. This may be achieved according to another embodiment of pulse inhibit circuit 48 by integrating the complement of the horizontal synchronizing pulse train of FIG. 2*e* to obtain the inhibit cycle control signal. The complement of the horizontal synchronizing pulse train may be obtained from a complementary output 58 of binary scaler 28.

Operation of automatic phase control circuit 40 beyond its pull-in range may be affected by the inhibit cycle of gate 52 since the inhibit cycle may then occur during asymmetrical portions of the sawtooth voltage signal with respect to the reference voltage level. This causes the regenerated horizontal sync pulses to sample the sawtooth voltage signal unequally above and below the reference voltage level, thereby causing the control voltage from low pass filter 56 to be offset by a DC voltage bearing no relation to the phase difference between the sawtooth voltage signal and the regenerated horizontal sync pulse train. A control circuit may therefore be included in pulse inhibit circuit 48 to prevent the inhibit cycle of gate 52 when the synchronizing system is appreciably out of synchronism with the composite synchronizing signal. This control circuit includes a high pass filter 60 connected for receiving the control signal from low pass filter 56. Low pass filter 56 has a cut off frequency of about 300 cycles and high pass filter 60 has a cutoff frequency of about 3 cycles. This combination of filters 56 and 60 effectively provides a band pass filter for passing only the AC beat signal produced by phase comparator 44 when the sawtooth voltage signal and the regenerated horizontal sync pulse train occur out of phase and at different rates. The AC beat signal passed by filters 56 and 60 is supplied to a rectifier and then to another low pass filter, as indicated by block 62, to produce a control signal for enabling gate 52. Low pass filter 62 is connected for supplying this control signal to another control input of gate 52 to prevent the inhibit cycle of gate 52.

The above-described control circuit automatically prevents the inhibit cycle of gate 52 whenever the sawtooth voltage signal and the regenerated horizontal sync pulse train supplied to phase comparator 44 have a phase difference great enough to produce substantially one or more cycles of AC beat signal at the output of low pass filter 56. When this control circuit is included in pulse inhibit circuit 48, the complement of the horizontal synchronizing pulse train of FIG. 2*e* may be used to control the duration of the inhibit cycle. This is accomplished by actuating ganged switch 64 to disconnect gate 50 from the outputs of oscillator 26 and binary scaler 28 and to connect the complementary output 58 of binary scaler 28 to the other control input of gate 52.

I claim:

1. A circuit for extracting a first train of signals having a first repetition rate from a second train of signals having a second repetition rate equal to an even integral multiple *n* of the first repetition rate, said circuit comprising:
   a control circuit for receiving the second train of signals: and
   means for providing a third train of signal having the first repetition rate, said means being connected to said control circuit for supplying the third train of signals to the control circuit in coincidence with every *n*th signal of the second train;
   said control circuit being responsive to the second and third trains of signals for providing the first train of signals.
2. A circuit as in claim 1 wherein said means comprises:
   an oscillator for producing a fourth train of signals having the second repetition rate; and
   first control means connected to said oscillator for producing the third train of signals from the fourth train of signals, said first control means being connected to said control circuit for supplying the third train of signals thereto.
3. A circuit as in claim 2 wherein said first control means comprises:
   a divider connected to said oscillator for dividing the repetition rate of the fourth train of signals by *n* to produce the third train of signals; and
   means for connecting said divider to said control circuit to supply the third train of signals thereto.
4. A circuit as in claim 2 wherein said first control means comprises:
   a divider connected to said oscillator for dividing the repetition rate of the fourth train of signals by *n* to produce a fifth train of signals; and
   means connected to said oscillator and to said divider and responsive to the fourth and fifth trains of signals therefrom for producing the third train of signals; said last-mentioned means being connected to said control circuit for supplying the third train of signals thereto.
5. A circuit as in claim 2 including:
   a feedback circuit connected to said oscillator for locking the oscillator in phase with the second train of signals and for stabilizing the repetition rate of the fourth train of signals at the second repetition rate; and
   second control means connected between said feedback circuit and said control circuit, said second control means being responsive to operation of the feedback circuit beyond its pull-in range for causing the control circuit to provide the second train of signals.
6. A circuit as in claim 5 wherein:
   said integral multiple *n* equals two so that the second repetition rate; and
   said control circuit comprises a gate, said gate being disabled by the signals of the third train to inhibit passage of every other signal of the second train and being enabled during the intervals between successive signals of the third train to pass the remaining signals of the second train and thereby provide the first train of signals.
7. A circuit as in claim 6 wherein said feedback circuit includes:
   a scale of two divider connected to said oscillator for halving the repetition rate of the fourth train of signals to produce signals having the first repetition rate;
   phase comparison means responsive to a train of the signals from said scale of two divider and to the train of signals passed by said gate for producing a signal related to the phase difference between these trains of signals; and
   third control means including a low pass filter connecting said phase comparison means to said oscillator, said third control means being responsive to the signal from said phase comparison means for supplying said oscillator with an error signal to lock the oscillator in phase with the second train of signals and to stabilize the repetition rate of the fourth train of signals at the second repetition rate.

8. A circuit as in claim 7 wherein said second control means includes:
AC coupling means connected to said third control means and operable for passing an AC beat portion of the error signal therefrom, said AC beat portion being produced when the phase difference between a train of the signals from said scale of two divider and the train of signals passed by said gate is beyond the pull-in range of said feedback circuit; and
means connected between said AC coupling means and said gate and responsive to the AC beat portion of the error signal for supplying the gate with a control signal to prevent its inhibit cycle and thereby cause the gate to pass the second train of signals.

9. A circuit as in claim 8 wherein said first control means comprises:
said scale of two divider; and
means for connecting said scale of two divider to said gate to supply the third train of signals thereto.

10. A circuit as in claim 8 wherein said first control means comprises:
said scale of two divider; and
another gate connected to said oscillator and to said scale of two divider and responsive to the fourth train of signals from said oscillator and to a train of the signals from said scale of two divider for providing the third train of signals, said other gate being connected to said first-mentioned gate for supplying the third train of signals thereto.

11. A circuit for inhibiting signals occurring during the time intervals between selected signals having a desired repetition rate in a first train of signals to provide a second train of signals having the desired repetition rate, said circuit comprising:
a control circuit for receiving the firs t train of signals: and
means for providing a third train of signals having the desired repetition rate and occurring during the time intervals between the selected signals of the first train, said means being connected to said control circuit for supplying the third train of signals to the control circuit during the time intervals between the selected signals of the first train;
said control circuit being responsive to the third train of signals for inhibiting signals of the first train that occur during the time intervals between the selected signals of the firs train.

12. A circuit as in claim 11 wherein said means comprises:
an oscillator for producing a fourth train of signals; and
control means connected to said oscillator for producing the third train of signals from the fourth train of signals, said control means being connected to said control circuit for supplying the third train of signals thereto during the time intervals between the selected signals of the first train.

13. A circuit as in claim 12 wherein said control circuit comprises a gate having a first input for receiving the first train of signals, a second input for receiving the third train of signals, and an output, said gate being disabled the the signals of the third train to inhibit passage of signals of the first train that occur during the time intervals between the selected signals of the first train and being enabled during the time intervals between successive signals of the third train to pass the selected signals of the first train and thereby provide the second train of signals having the desired repetition rate at its output.

14. A circuit as in claim 13 wherein said control means comprises:
means connected to said oscillator for deriving a fifth train of signals from the fourth train of signals; and
another gate connected to said oscillator and to said last-mentioned means and responsive to said fourth and fifth trains of signals therefrom for providing the third train of signals, said other gate being connected to the second input of said first-mentioned gate for supplying the third train of signals thereto.

15. A circuit for extracting a first train of signals having a first repetition rate from a second train of signals having a second repetition rate equal to an integral multiple *n* of the first repetition rate, said circuit comprising:
a control circuit having a first input for receiving the second train of signals, having a second input, and having an output;
first means for producing a third train of signals having the second repetition rate; and
second means connected to said first means and responsive to the third train of signals therefrom for producing a fourth train of signals having the first repetition rate, said second means being connected to the second input of said control circuit for supplying the fourth train of signals thereto;
said control circuit being responsive to the second and fourth trains of signals for providing the first train of signals at its output.

16. A circuit as in claim 15 wherein:
said first means comprises an oscillator for producing the third train of signals, and a divider connected to said oscillator for dividing the repetition rate of the third train of signals by *n* to produce a fifth train of signals having the first repetition rate; and
said second means is connected to said oscillator and to said divider and is responsive to the third nand fifth trains of signals therefrom for producing the fourth train of signals, said seconds means being connected to the second input of said control circuit for supplying the fourth train of signals thereto.

17. A circuit as in claim 16 wherein:
said integral multiple *n* equals two so that the second repetition rate equals twice the first repetition rate; and
said control circuit comprises a first gate, said gate being disabled by the signals of the fourth train to inhibit passage of every other signal of the second train and being enabled during the intervals between successive signals of the fourth train to pass the remaining signals of the second train and thereby provide the first train of signals at its output.

18. A circuit as in claim 17 wherein said second means comprises a second gate connected to said oscillator and to said divider and responsive to the third train of signals from said oscillator and to the fifth train of signals from said divider for providing the fourth train of signals, said second gate being connected to the second input of said first gate for supplying the fourth train of signals thereto.

UNITED STATES PATENT OFFICE

CERTIFICATE OF CORRECTION

Patent No. 3,567,857 Dated March 2, 1971

Inventor(s) Robert E. Lynn

It is certified that error appears in the above-identified patent and that said Letters Patent are hereby corrected as shown below:

Column 1, line 68, "time" should read -- timed --;

Column 2, line 40, after "at" insert -- 14 --; line 70, after "with a" insert -- relatively steep slope and a longer positive-going ramp with a --;

Column 3, line 30, "tope" should read -- top --; line 57, "tow" should read -- two --;

Column 6, line 53, after "rate" insert -- equals twice the first repetition rate --; line 69, after "filter" insert -- and --;

Column 7, line 45, "firs" should read -- first --; line 57, cancel "the" (first occurrence) and insert -- by -

Column 8, line 39, "nand" should read -- and --.

Signed and sealed this 29th day of June 1971.

(SEAL)
Attest:

EDWARD M.FLETCHER,JR.
Attesting Officer

WILLIAM E. SCHUYLER, J
Commissioner of Patent